United States Patent [19]
Kuester et al.

[11] Patent Number: 5,016,185
[45] Date of Patent: May 14, 1991

[54] ELECTROMAGNETIC PYRAMIDAL CONE ABSORBER WITH IMPROVED LOW FREQUENCY DESIGN

[75] Inventors: Edward F. Kuester; Christopher L. Holloway, both of Boulder, Colo.

[73] Assignee: University of Colorado Foundation, Inc., Boulder, Colo.

[21] Appl. No.: 328,409

[22] Filed: Mar. 24, 1989

[51] Int. Cl.$^5$ .......................... G06F 15/60; E04B 1/82
[52] U.S. Cl. .................................. 364/481; 73/865.6; 181/284; 364/512; 364/578
[58] Field of Search ............... 181/284, 286; 73/865.6; 364/300, 413.3, 480, 481, 512, 578; 342/1, 4

[56] References Cited

U.S. PATENT DOCUMENTS 4,477,505 10/1984 Warnaka .............................. 181/284
4,868,770 9/1989 Smith et al. ......................... 364/578

OTHER PUBLICATIONS

"Understanding Microwave Absorbing Materials and Anechoic Chambers—Part 1", by Steven Galagan, *Microwaves*, vol. 8, No. 12, Dec. 1969, pp. 38–41.
"Understanding Microwave Absorbing Materials and Anechoic Chambers—Part 2", by Steven Galagan, *Microwaves*, vol. 9, No. 1, Jan. 1970, pp. 44–49.
"Understanding Microwave Absorbing Materials and Anechoic Chambers—Part 3", by Steven Galagan, *Microwaves*, vol. 9, No. 4, Apr. 1970, pp. 47–50.
"Understanding Microwave Absorbing Materials and Anechoic Chambers—Part 4", by Steven Galagan, *Microwaves*, vol. 9, No. 5, May 1970, pp. 69–73.

*Primary Examiner*—Kevin J. Teska
*Attorney, Agent, or Firm*—William E. Hein; Earl C. Hancock

[57] ABSTRACT

A pyramidal cone absorber structure is equated to an effective absorbing layer model having effective permittivity and permeability properties. A Riccati equation, governing the coefficient of reflection of the effective absorbing layer is derived. A computer program solves the Ricatti equation for the coefficient of reflection using initial values of complex permittivity. Iterative solutions are then obtained using increasing values of complex permittivity until no further reduction in the maximum coefficient of reflection over a specified frequency range is obtained, thus indicating optimum performance of the pyramidal cone absorber structure for a given set of cone dimensions. Optimization of the pyramidal cone absorber structure may also be optimized for a fixed set of complex permittivity values by varying the cone length and backing layer dimensions while maintaining the sum of those two dimensions constant.

3 Claims, 4 Drawing Sheets

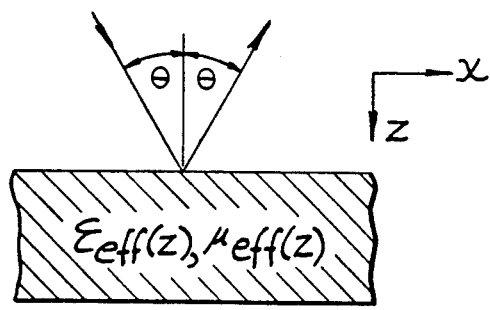
FIG. 4
FIG. 5
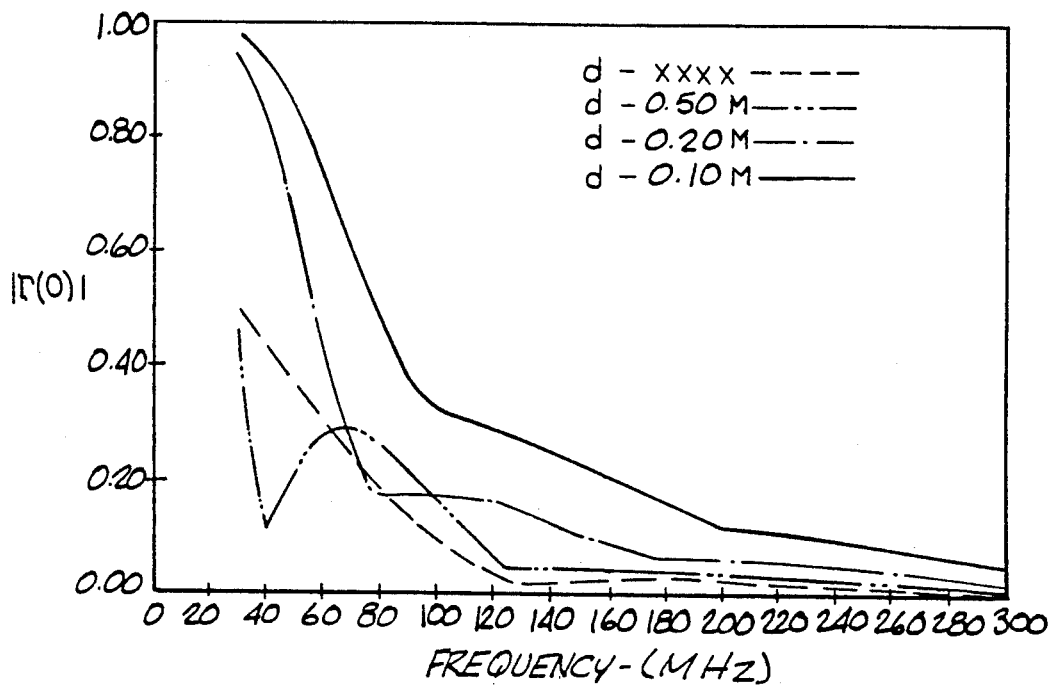

ELECTROMAGNETIC PYRAMIDAL CONE ABSORBER WITH IMPROVED LOW FREQUENCY DESIGN

BACKGROUND AND SUMMARY OF THE INVENTION

This invention relates generally to anechoic chambers of the type used for measuring the amount of electromagnetic radiation emitted by electrical equipment under test and more specifically to a method for optimizing the low-frequency design of pyramid cone absorbers employed in such chambers. The Federal Communications Commission (FCC) imposes limits on the amount of electromagnetic radiation emitted by electrical equipment sold in the United States. As a result, such electrical equipment must be tested to insure compliance with the FCC regulations. These tests are required to be performed over a frequency range of 30–1000 MHz in an open field environment. The emitted electromagnetic radiation at specified test frequencies within this range must be less than a limit value. Open field testing is not ideal because the tests are not repeatable due to changing factors in the environment itself. Factors such as humidity, weather conditions, soil conductivity, and proximity of the test site to buildings, trees, and commercial broadcast radio stations have the effect of altering the conductivity of the test environment and interrupting test scheduling. In view of these problems with open field testing, the FCC permits tests to be conducted in anechoic chambers so long as the chamber test results can be correlated with open field measurements.

An understanding of microwave absorbing materials and their use in anechoic chambers may be had with reference to S. Galagan, *Understanding Microwave Absorbing Materials and Anechoic Chambers—Parts 1–4*, Microwaves, Vol. 8, No. 12 and Vol. 9, Nos. 1, 4, and 5 (December, 1969, and January, April, May, 1970). At the high-frequency end (typically 300–1000 MHZ) of the test frequency range, tests have generally been performed inside anechoic chambers. At these high frequencies the skin-depth of the incident electromagnetic radiation is very small compared to the thickness of the backing absorber lining the metal walls of the anechoic chamber. Therefore, the electromagnetic radiation is mostly absorbed in the tapered section of the pyramidal absorbing structure. This results in only a very small portion of the incident electromagnetic radiation interacting with and being reflected from the metal walls of the anechoic chamber. Also, at these high frequencies, the wavelength of the incident electromagnetic radiation is small compared to the dimensions of the pyramidal absorber structure. Thus, the incident electromagnetic radiation sees the fine structure, or each individual shape in the absorber array. Through the use of geometric optics analysis, it can be shown that the incident electromagnetic radiation is bounced off the tapered section of a pyramidal absorber several times, propagating both in and out of the absorber structure. A certain amount of the incident electromagnetic radiation is absorbed during each bounce, so that only a very small amount of energy remains after the incident electromagnetic radiation has exited the absorber structure, as illustrated in FIG. 1, thereby resulting in a low coefficient of reflection.

The poor performance of anechoic chambers at the low-frequency end (typically 30–300 MHZ) of the test frequency range can be explained using the same analysis as recited above. At these low frequencies, the skin depth of the incident electromagnetic radiation is large compared to the dimensions of the pyramidal absorber employed in the anechoic chamber. As a result, the incident electromagnetic radiation passes easily through the tapered section of the pyramidal absorber into the backing absorber and onto the metal wall of the anechoic chamber. Little or none of the incident electromagnetic radiation is absorbed before it interacts with the metal wall, thereby resulting in a high coefficient of reflection. At the low-frequency end of the test frequency range, the wavelength is large compared to the dimensions of the pyramidal absorbers. The incident electromagnetic radiation does not see the fine structure of the pyramidal absorbers, but sees an effective or averaged layer of absorber. Therefore, the incident electromagnetic radiation bounces only once off the effective layer, as illustrated in FIG. 2, resulting in the absorption of much less energy than in the high frequency case and in large reflections off the walls of the anechoic chamber.

It is thus the principal object of the present invention to accurately model and optimize the low-frequency properties of pyramidal cone absorbing structures as an aid in designing such structures for use in anechoic chambers. This object is accomplished by providing a process for optimizing the coefficient of reflection of a pyramidal cone absorbing structure over a desired frequency range.

To analyze the low frequency response of the anechoic chamber walls, the pyramidal absorber structure is equated to an effective absorbing layer. Maxwell's equations are separated into a perpendicular polarization and a parallel polarization set of equations. With these two sets of equations, the effective permittivity and permeability for both polarizations of the equivalent layer can be determined.

The effective material properties $\epsilon_{eff}(z)$ and $\mu_{eff}(z)$ are functions of z, the coordinate penetrating into the pyramidal absorbing structure. This coordinate dependence on the effective material properties is due to the geometry of the pyramidal absorbing structure. That is, the cross-section of the structure changes as z changes. These effective properties are also functions of the transverse and longitudinal material properties of the effective layer. The transverse and longitudinal material properties are also a result of the geometry of the pyramidal absorbing structure, and themselves are functions of the coordinate z.

The longitudinal and transverse material properties are obtained through a technique known as homogenization. Homogenization allows separation of the average field values from the microstructure of the fields. It is then possible to examine only the average field values. The averaged fields satisfy Maxwell's equations in a medium where the properties of the medium are replaced by homogenized or averaged values.

Once Maxwell's equations are broken into the two polarizations, each set of equations is arranged in such a manner that they are reduced to the classical transmission line equations. With the equations arranged in this manner, an expression for a general coefficient of reflection can be obtained, and from this general coefficient of reflection, the expression representing the coefficient of reflection for the absorbing structure is obtained.

The process, which is most efficiently performed using a computer, involves an initial choice of complex permittivity values at the desired frequencies. Using this initial value of complex permittivity, the expression representing the coefficient of reflection (reflection coefficient) is evaluated. If not as low as desired, the coefficient of reflection can be reduced by increasing the values of complex permittivity. This iterative process is followed until no further improvement in the computed value of the maximum coefficient of reflection over a specified frequency range is obtained. At this point, the pyramidal absorber is performing at its optimum for a given set of physical dimensions of the individual pyramidal cones comprising the pyramidal cone absorber structure. The process of the present invention may also be similarly employed to optimize the coefficient of reflection of the absorber structure for a fixed set of complex permittivity values by altering the pyramidal cone dimensions while maintaining the total length of the pyramidal cone plus backing layer thickness as a constant.

BRIEF DESCRIPTION OF THE DRAWINGS

FIG. 4 is a diagram illustrating the modeling of a pyramidal cone absorber structure as an effective layer of absorber material having effective values of permittivity and permeability.

FIG. 5 is a diagram illustrating the numerical results of solutions of a Riccati equation, governing the coefficient of reflection of the effective absorbing layer of FIG. 4, in the case of perpendicular polarization and with the thickness of the backing layer of absorber material varied between 0.1 meter and infinity.

DETAILED DESCRIPTION OF THE INVENTION

Figure 3:
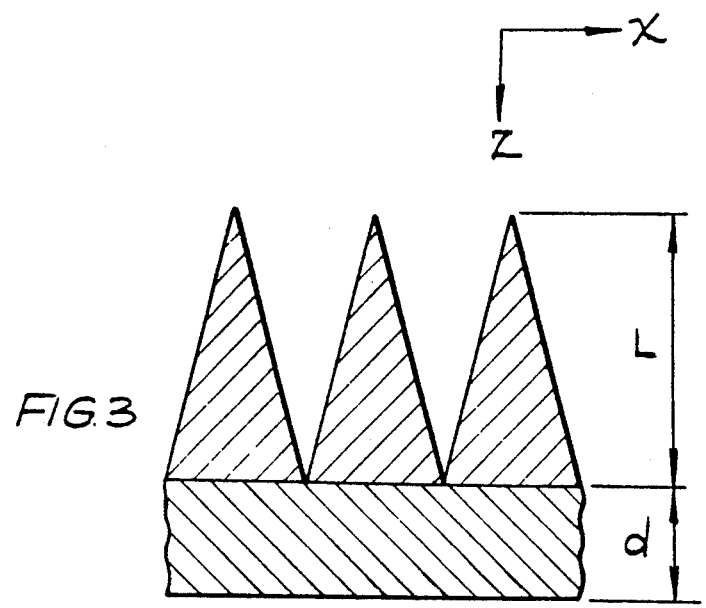
FIG. 3 is a diagram illustrating a portion of a pyramidal cone absorber structure including tapered cone sections and a backing layer of absorber material.

Referring now to FIG. 3, there is shown a portion of a pyramidal cone absorbing structure as typically employed in an anechoic chamber. Dimension L is the length of the tapered section of each pyramidal cone and dimension d is the thickness of the backing layer. In developing a model of a wall of the anechoic chamber, the technique of homogenization is utilized to equate the absorbing structure to an effective layer. Using homogenization, the material properties of the homogenized medium are then obtained and, with the aid of Maxwell's equations, expressions representing the material properties of the effective layer and the coefficient of reflection of the effective layer are developed. It has been demonstrated through homogenization, that at low frequencies where the period of a pyramidal cone absorbing structure is small compared to a wavelength, the structure behaves as a one-dimensional inhomogeneous but anisotropic medium, as far as the "average" fields are concerned. The equivalent permittivity and permeability for this structure are obtained from the solution of the static array using analysis techniques well known to those skilled in the art.

Once the pyramidal cone absorbing structure has been reduced to an effective layer, an equivalent transmission line description of this effective layer for both parallel and perpendicular polarization and for various incident angles of the fields can be developed. Two assumptions are made with respect to the effective layer illustrated in FIG. 4. First, the incident electromagnetic radiation fields are plane waves and are incident on the effective layer 10 at an angle 0(theta). Second, the plane of incidence is the xz-plane, as illustrated in FIG. 4. Using these assumptions, the y dependence on the fields is zero. Maxwell's equations can be decoupled into two independent sets of equations, one set for perpendicular polarization and one set for parallel polarization. By perpendicular polarization, it is meant that the electric field is directed perpendicularly to the plane of incidence. By parallel polarization, it is meant that the electric field is directed parallel to the plane of incidence. A general set of equations for the electromagnetic fields may be derived using mathematical relationships well known to those skilled in the art, to be the following:

$$\frac{dE(z)}{dz} = -jw\hat{\mu}_{eff}(z)H(z)$$

and;

$$\frac{dH(z)}{dz} = -jw\hat{\epsilon}_{eff}(z)E(z)$$

It is understood by those of ordinary skill in the art that the coefficient of reflection for a plane wave at the surface of an interface of an inhomogeneous layer is given by Schelkumoff's equation. To obtain the differential equation for the coefficient of reflection as the wave propagates through the tapered section of the pyramidal cone absorber structure, Schelkumoff's equation is differentiated with respect to z and the following is obtained:

$$\Gamma' = \frac{(1-\Gamma)^2}{2Z_c} Z' - \hat{N}(z)[1 - \Gamma^2(z)]$$

where:

$$\hat{N}(z) = \frac{\hat{Z}_c'(z)}{2Z_c(z)}$$

is a measure of the nonuniformity of the characteristic impedance. If $Z_c$ is constant as in a homogeneous section, then $N=0$ and the well-known solution of the coefficient of reflection of a homogeneous medium with constant characteristic impedance is obtained:

$$\Gamma(z) = \Gamma(0)\exp\left[2\int_0^z \hat{\gamma}(z')dz'\right]$$

By mathematical substitution involving this equation, the following equation, referred to as a Riccati equation for $\Gamma(z)$, governing the coefficient of reflection of the effective absorbing layer of FIG. 4 is obtained:

$$\Gamma'(z) = 2\hat{\gamma}(z)\Gamma(z) - \hat{N}(z)[1 - \Gamma^2(z)]$$

Although the Riccati equation above can be solved numerically using standard ordinary differential equation solvers, well known closed-form approximate solutions may also be used.

The bulk properties $\hat{\epsilon}_a$ have been measured experimentally over the frequency range of 30–200 MHz for a typical commercially available type of graphite-impregnated foam absorber. The results are shown in Tables 1 and 2 below. Table 1 illustrates the measured bulk properties of 6-foot and 4-foot Rantech cone absorbers, and Table 2 illustrates the measured bulk properties of 6-foot and 4-foot Rantech cone absorbers that have been more heavily doped than those whose measurement results are shown in Table 1.

TABLE 1

| Frequency (MHz) | 6 ft cones | | 4 ft cones | |
|---|---|---|---|---|
| | $\epsilon_r'$ | $\epsilon_r''$ | $\epsilon_r'$ | $\epsilon_r''$ |
| 30 | 5.4 | 10.3 | 6.7 | 12.0 |
| 35 | 4.7 | 9.6 | 5.94 | 10.9 |
| 40 | 4.3 | 8.5 | 5.4 | 10.0 |
| 45 | 3.9 | 7.9 | 4.9 | 9.3 |
| 50 | 3.5 | 7.4 | 4.5 | 8.7 |
| 55 | 3.3 | 7.0 | 4.2 | 8.3 |
| 60 | 3.0 | 6.6 | 3.9 | 7.8 |
| 65 | 2.8 | 6.3 | 3.6 | 7.4 |
| 70 | 2.7 | 6.0 | 3.4 | 7.1 |
| 75 | 2.5 | 5.8 | 3.2 | 6.8 |
| 80 | 2.4 | 5.5 | 3.1 | 6.6 |
| 85 | 2.2 | 5.4 | 3.1 | 6.4 |
| 90 | 2.1 | 5.2 | 2.8 | 6.2 |
| 95 | 2.0 | 5.0 | 2.6 | 6.0 |
| 100 | 1.9 | 4.9 | 2.5 | 5.9 |
| 120 | 1.6 | 4.5 | 2.1 | 5.4 |
| 140 | 1.4 | 4.2 | 1.8 | 5.1 |
| 160 | 1.2 | 4.0 | 1.6 | 4.8 |
| 180 | 1.0 | 3.8 | 1.3 | 4.7 |
| 200 | 1.0 | 3.7 | 1.2 | 4.6 |

TABLE 2

| Frequency (MHz) | 6 ft cones | | 4 ft cones | |
|---|---|---|---|---|
| | $\epsilon_r'$ | $\epsilon_r''$ | $\epsilon_r'$ | $\epsilon_r''$ |
| 30 | 4.41 | 2.24 | 15.21 | 10.22 |
| 35 | 4.23 | 2.11 | 13.94 | 10.03 |
| 40 | 4.11 | 1.95 | 12.97 | 9.87 |
| 45 | 3.98 | 1.84 | 12.08 | 9.66 |
| 50 | 3.89 | 1.75 | 11.30 | 9.49 |
| 55 | 3.83 | 1.68 | 10.68 | 9.35 |
| 60 | 3.74 | 1.60 | 10.08 | 9.17 |
| 65 | 3.70 | 1.57 | 9.55 | 9.03 |
| 70 | 3.66 | 1.50 | 9.09 | 8.90 |
| 75 | 3.61 | 1.47 | 8.65 | 8.78 |
| 80 | 3.58 | 1.41 | 8.27 | 8.66 |
| 85 | 3.56 | 1.38 | 7.90 | 8.59 |
| 90 | 3.52 | 1.34 | 7.55 | 8.44 |
| 95 | 3.49 | 1.31 | 7.24 | 8.37 |
| 100 | 3.47 | 1.29 | 6.93 | 8.29 |
| 120 | 3.40 | 1.21 | 5.84 | 7.98 |
| 140 | 3.37 | 1.16 | 4.92 | 7.79 |
| 160 | 3.36 | 1.13 | 4.10 | 7.61 |
| 180 | 3.37 | 1.22 | 3.31 | 7.44 |
| 200 | 3.39 | 1.23 | 2.55 | 7.21 |

Figure 1:
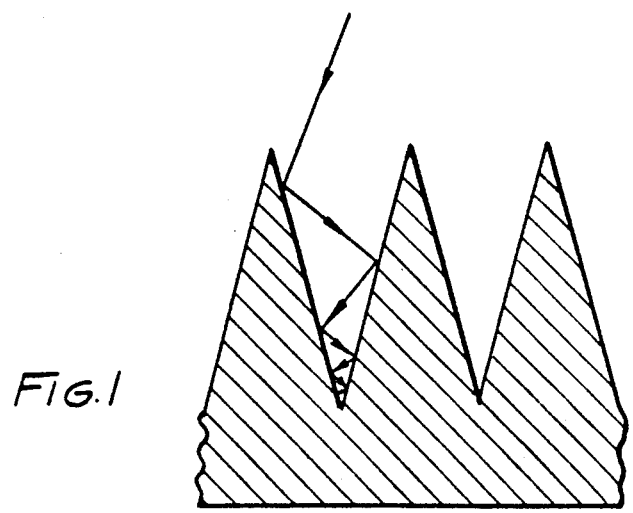
FIG. 1 is a diagram illustrating propagation of incident electromagnetic radiation through a pyramidal cone absorber at high frequencies, resulting in significant attenuation of the incident electromagnetic radiation following several bounces against the absorber structure.
Figure 2:
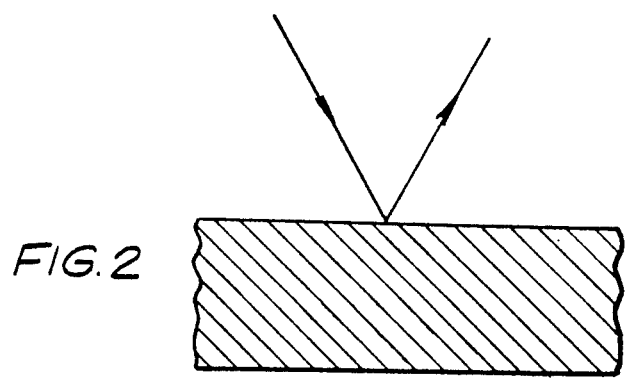
FIG. 2 is a diagram illustrating single-bounce propagation of incident electromagnetic radiation through a pyramidal cone absorber at high frequencies, usually resulting in a large reflection of the incident electromagnetic radiation off the absorber structure.
Figure 6:
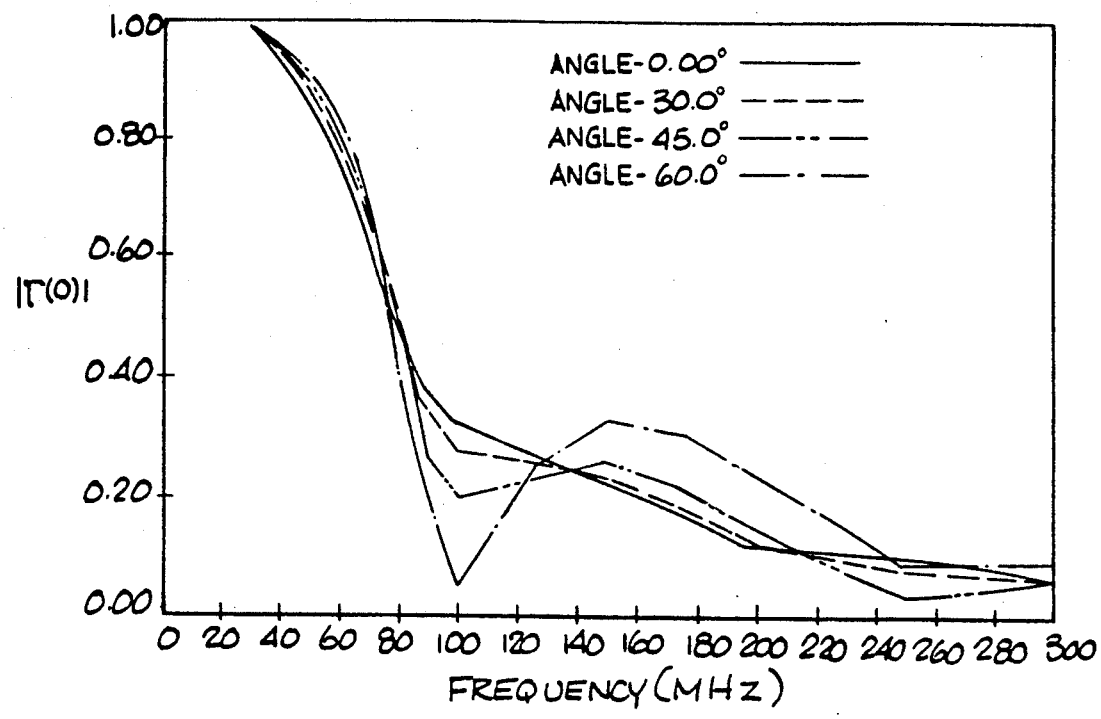
FIG. 6 is a diagram illustrating the numerical results of solutions of a Riccati equation, governing the coefficient of reflection of the effective absorbing layer of FIG. 4, in the case of perpendicular polarization, with the thickness of the backing layer of absorber material being 0.1 meter, and with the angle of incidence of the electromagnetic radiation being varied between 0, 30, 45, and 60 degrees.

A wall of pyramidal cone absorbers, as illustrated in FIG. 2, was analyzed using the mathematical model (Riccati equation) described above. It was assumed that the wall extended infinitely in all directions, thus allowing the end effects to be ignored. This analysis was performed for both the perpendicular and parallel polarizations. For both polarizations, it was assumed that the plane wave was incident on the boundary at different angles from the z-axis measured in the plane of incidence. In this structure, it was also assumed that the edge was oriented along the y-axis. The tapered length L of each cone was set at 1 meter and the backing layer thickness d was varied from 0.1 meter to infinity. The numerical results of solutions of the Riccati equation for perpendicular polarization are shown in the plot of FIG. 5. FIG. 6 is a plot of the Ricatti equation for perpendicular polarization, with dimension d equal to 0.1 meter and the angle of incidence being 0, 30, 45 and 60 degrees. For parallel polarization, the numerical results of the Riccati equation are the same as for perpendicular polarization when the angle of incidence is zero. The numerical results of solutions of the Riccati equation for parallel polarization with dimension d equal to 0.1 meter and the angle of incidence being 0, 30, 45 and 60 degrees are shown in FIG. 7.

Figure 7:
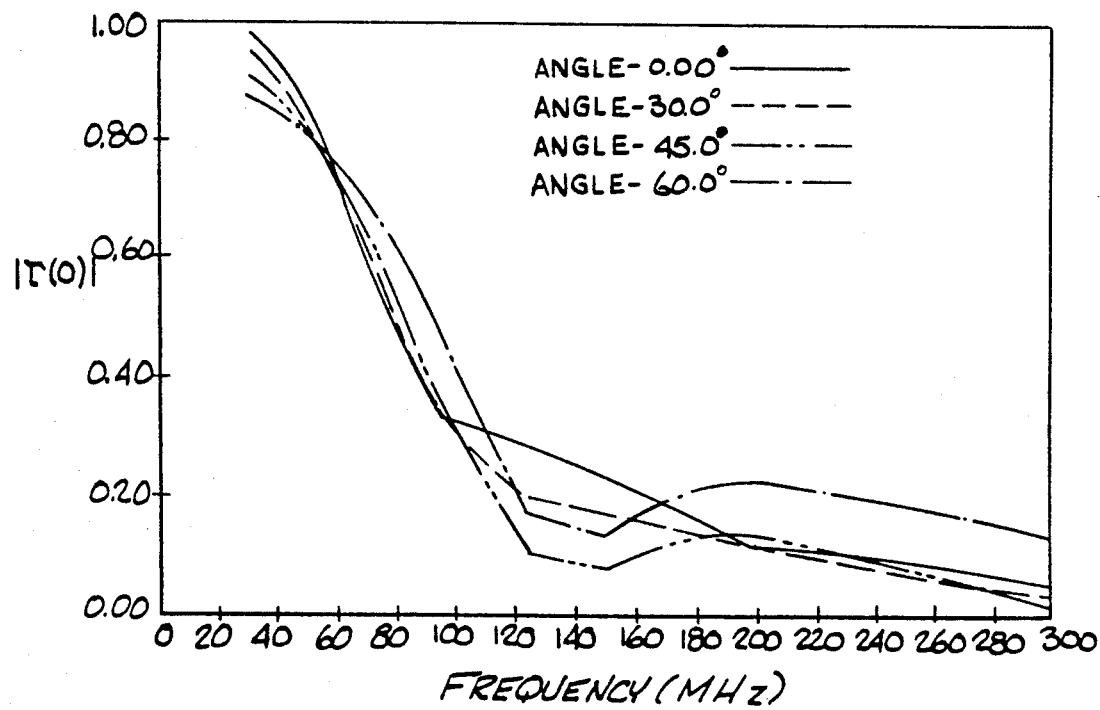
FIG. 7 is a diagram illustrating the numerical results of solutions of a Riccati equation, governing the coefficient of reflection of the effective absorbing layer of FIG. 4, in the case of parallel polarization, with the thickness of the backing layer of absorber material being 0.1 meter, and with the angle of incidence of the electromagnetic radiation being varied between 0, 30, 45, and 60 degrees.

The results of numerical solution of the Riccati equation similar to those illustrated in FIGS. 5–7 were compared with measured results obtained from an experimental anechoic chamber employing a pyramidal cone absorber structure. It was concluded that the low frequency model of the pyramidal cone structure represented by the Riccati equation above correlates quite well with the measured results obtained from the experimental anechoic chamber and, therefore, that this model can be employed with confidence to develop techniques to improve the low frequency response of the anechoic chamber walls.

The following computer program listing forms a process that employs given values of the physical dimensions of an array of pyramid cone absorbers and bulk electrical material properties (complex relative permittivity) to produce theoretical values of the coefficients of reflection of normally incident plane waves from a pyramidal cone absorber structure, based upon the low frequency model of the pyramidal cone absorber structure described hereinabove. The process requires the use of a subroutine referred to as SOLVE in the program listing, to solve a first-order differential equation. Such subroutines are well known by those of ordinary skill in the art and are usually provided in standard subroutine libraries such as NAG, IMSL, etc. The complex permittivity is read into the computer by the program from a specified file at each of a user-selected set of frequencies (in megahertz). FCNRR is a routine that contains the effective material properties of the absorber material for the case of perpendicular polarization. FCNLL is a routine that contains the effective material properties of the absorber material for the case of parallel polarization. The output of the program, written to a user-designated file, is the magnitude of the coefficient of reflection at each of these same frequencies.

Figure 8:
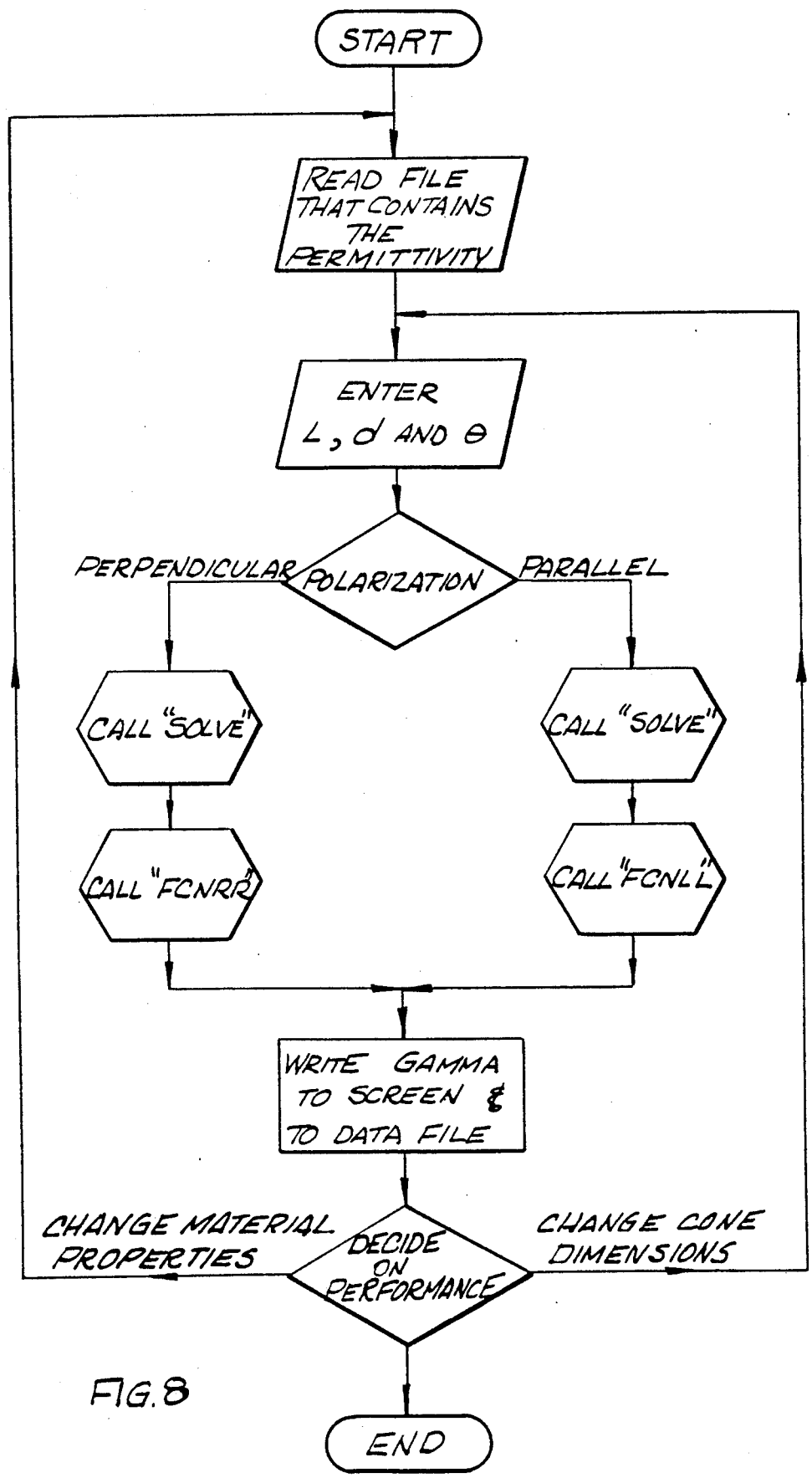
FIG. 8 is a flow chart of the steps employed in using the process of the present invention to optimize the low-frequency performance of a pyramidal cone absorber structure.

The process of the attached program listing may be used to optimize the performance of a pyramidal cone absorber structure over a given range of frequencies. As may be seen in the flow chart of FIG. 8, an initial choice of complex permittivity values at the desired frequencies is made. The program is then run to determine the magnitude of the coefficient of reflection resulting from the chosen complex permittivity values. In the event a lower maximum coefficient of reflection is desired, the complex permittivity values can be increased and the program run again. This procedure may be repeated until no further improvement (reduction) in the maximum coefficient of reflection is obtained. At this point, the absorber is performing at its optimum for a given set of cone dimensions. The process of the present invention may also be used to optimize the pyramidal cone absorber structure for a fixed set of complex permittivity values by changing the values of the cone dimensions L and d, while maintaining the total length (L+d) constant. The process is otherwise exactly the same as for variations in complex permittivity.

```
C
C
C     *********************************
C     *********************************
C
C
C        PROGRAM   LFCAD
C        VERSION   1.0
C        SEPTEMBER  1988
C
C     *********************************
C     *********************************
C
C
C        CHRISTOPHER L. HOLLOWAY AND EDWARD F. KUESTER
C              ELECTROMAGNETICS LABORATORY
C        DEPARTMENT OF ELECTRICAL AND COMPUTER ENGINEERING
C                    CAMPUS BOX 425
C                  UNIVERSITY OF COLORADO
C                BOULDER, COLORADO 80309-0425
C
C
C     ***************************************************
C     ***************************************************
C
C  THIS PROGRAM IS USED TO CALCULATE THE LOW FREQUENCY
C       REFLECTION COEFFICIENT FOR AN ARRAY OF SQUARE
C       PYRAMID ABSORBING CONES.  THE MODEL USED IN
C       THE ANALYSIS WAS DEVELOPED BY DR. EDWARD F. KUESTER
C       AND CHRISTOPHER L. HOLLOWAY AT THE UNIVERSITY
C       OF COLORADO.
C
C
C  THIS PROGRAM READS THE COMPLEX PERMITTIVITY OF THE ABSORBING
C       MATERIAL FROM A DATA FILE, AND THEN THE CALCULATED REFLECTION
C       COEFFICIENT IS STORED INTO A SEPARATE DATA FILE.
```

```
C
C       DATA FILES:
C
C           1) COMPLEX PERMITTIVITY
C
C               THIS DATA FILE IS TO CONTAIN THE COMPLEX RELATIVE
C               PERMITTIVITY (EPSILON) VS FREQUENCY (IN MEGAHERTZ).
C               THE FILE MUST BE ARRANGED IN THE FOLLOWING MANNER:
C
C           FREQUENCY(MHz),REAL PART OF EPSILON,IMAGINARY PART OF EPSILON
C
C
C           2) REFLECTION COEFFICIENT
C
C               THIS IS THE DATA FILE WHERE THE MAGNITUDE OF
C               THE REFLECTION COEFFICIENT (GAMMA) VS FREQUENCY
C               IS TO BE STORED.  THE VALUE ARE STORED IN THE
C               FOLLOWING MANNER:
C
C           FREQUENCY(MHz),MAGNITUDE OF GAMMA
C
C
C       **********************************************************
C       **********************************************************
C
C
C
C
C       %%%%%%%%%%%%%%%%%%%%%%%%%%%%%%%%%%%%%%%%%%%%%%%%%%%
C       %%%%%%%%%%%%%%%%%%%%%%%%%%%%%%%%%%%%%%%%%%%%%%%%%%%
C
C       THERE ARE FOUR SUBROUTINES USED IN THIS PROGRAM:
C
C           1) SOLVE(NEQ,FCN,X,XEND,TOL,Y)
C               This routine solves the Riccati equation.
C
C                       WHERE:  NEQ=2       the number of equations:
C                                           one real and one imaginary
C
C                               FCN         is the function that is called
C                                           from solve that calculates
C                                           the effective material
C                                           properties
C                               X=L         the length of the tapered
C                                           section of the cone
C                               XEND=0      the location where the solution
C                                           is desired (the tip of the cones)
```

```
C                              TOL       the accuracy of the
C                                        SOLVE routine
C                              Y         is the array that contains
C                                        the real and imaginary value
C                                        of the reflection coefficient
C
C          2) FCNLL(N,X,Y,YPRIME)
C             This routine is called from SOLVE and contains the material
C             properties for the parallel polarization and
C             calculates the derivative for the reflection coefficient
C             at an X.
C
C                     WHERE:  N=2       the number of equations:
C                                       one real and one imaginary
C                              X        is the value where the
C                                       derivative is desired
C                              Y        is the reflection coefficient
C                                       for the corresponding X value
C                              YPRIME   is the derivative of Y for the
C                                       corresponding X value
C
C          3) FCNRR(N,X,Y,YPRIME)
C             This routine is called from SOLVE and contains the material
C             properties for the perpendicular polarization and
C             calculates the derivative for the reflection coefficient
C             at an X.
C
C                     WHERE:  N=2       the number of equations:
C                                       one real and one imaginary
C                              X        is the value where the
C                                       derivative is desired
C                              Y        is the reflection coefficient
C                                       for the corresponding X value
C                              YPRIME   is the derivative of Y for the
C                                       corresponding X value
C
C          4) ANGLE(G)
C             This routine calculates the phase of the
C             reflection coefficient
C
C                     WHERE:   G        is the value of the reflection
C                                       coefficient
C
C   %%%%%%%%%%%%%%%%%%%%%%%%%%%%%%%%%%%%%%%%%%%%%%%%%%%
C   %%%%%%%%%%%%%%%%%%%%%%%%%%%%%%%%%%%%%%%%%%%%%%%%%%%
C
C
```

```
C
C
C
C
C
C
C
      PROGRAM LFCAD
         CHARACTER*12 U(3),DINPUT,DOUT
         REAL Q(50,3),L,Y(2),C(24),W(2,9),MG,AG,X,TOL,XEND
         REAL NZI,NZR,PI,PARAM(50)
         COMPLEX E,PRO,JPRO,FL,NO,KO,YY,G,JYY,NZ,CCC
         COMPLEX EEFF,TOP,BOT,ET,EEFFR,ZC,EPRIME,RIGHT,ZPRIME
         COMPLEX UBOT,UEFF,UPRIME,ZPL,ZPR
         EXTERNAL FCNRR,FCNLL,SOLVE
         COMMON DE,L,A,Q,IIII,KO,CCC,YY,JYY,NZ,E
C
C
C   AT THIS POINT OF THE PROGRAM, THE VALUES FOR EPSILON
C     (THE COMPLEX RELATIVE PERMITTIVITY) VS FREQUENCY
C     OF THE MATERIAL BEING ANALYZED ARE READ.
C
C
C
              WRITE(6,113)
  113         FORMAT(///////////////////////////////)
  997      PRINT*,'ENTER THE NAME OF THE DATA FILE '
           PRINT*,'   CONTAINING THE FREQUENCY POINTS'
           PRINT*,'    AND THE VALUES OF EPSILON'
           READ(5,6)DINPUT
C
              OPEN(UNIT=7,FILE=DINPUT,STATUS='UNKNOWN')
C
           PRINT*,' '
           PRINT*,' '
C
C
C   THIS IS WHERE THE NUMBER OF SAMPLE DATA POINTS THAT
C      THAT ARE IN THE EPSILON DATA FILE IS ENTERED
C
C
           PRINT*,'ENTER THE NUMBER OF DATA POINTS'
           READ(5,*) NUMBR
              PRINT*,' '
              PRINT*,' '
C
C
C   AT THIS POINT OF THE PROGRAM, THE NAME OF THE FILE WHERE
```

```
C          THE OUTPUT IS TO BE STORED IS ENTERED.
C
C
   998     PRINT*,'ENTER THE NAME OF THE FILE WERE GAMMA'
           PRINT*,'  IS TO BE STORED'
           READ(5,6)DOUT
   6       FORMAT(A)
C
           OPEN(UNIT=12,FILE=DOUT,STATUS='UNKNOWN')
C
         DO 3 K=1,50
           PARAM(K)=0.0
   3       CONTINUE
C
C
C     AT THIS POINT OF THE PROGRAM THE GEOMETRY OF THE CONE ARRAY
C        WAS ENTERED.  FIRST THE LENGTH OF THE TAPERED SECTION IS READ,
C     THEN THE LENGTH OF THE BULK LAYER IS READ.
C
C
           WRITE(6,322)
   322     FORMAT(/////////////////////////////////)
           PRINT*,'ENTER THE LENGTH (IN METERS) OF THE TAPERED'
           PRINT*,'       SECTION OF THE CONES'
           READ(5,*) L
           PRINT*,' '
           PRINT*,' '
           PRINT*,'ENTER THE THICKNESS (IN METERS) OF THE BULK LAYER'
           READ(5,*) AD
           PRINT*,' '
C
C
C     AT THIS POINT, THE INCIDENT ANGLE THAT THE
C        E-M WAVE MAKES WITH THE ARRAY OF CONES IS ENTERED
C
C
           PRINT*,'ENTER THE ANGLE OF INCIDENCE (IN RADS.)'
             READ(5,*)A
         N=2
         NEQ=2
C
           PRINT*,' '
           PRINT*,' '
           PRINT*,' '
C
C
```

```
              DO 10 I=1,NUMBR
C
C
C   READ IN THE FREQUENCY AND MATERIAL PROPERTIES
C       (COMPLEX RELATIVE PERMITTIVITY) FROM THE
C       DATA FILE.
C
C
   10         READ(7,*) (Q(I,K),K=1,3)

READ(7,*) U(1)
              M=2
              NN=3
              PI=4*ATAN(1.0)
C
C
C   AT THIS POINT OF THE PROGRAM THE USER CHOOSES WHICH
C      POLARIZATION OF THE E-FIELD IS TO BE ANALYZED
C
              WRITE(6,222)
  222         FORMAT(/////////////////////////)
              PRINT*,'ENTER THE CODE THAT CORRESPONDS TO'
              PRINT*,'   THE POLARIZATION OF INTEREST'
              WRITE(6,223)
  223         FORMAT(//,1X,'CODE',6X,'POLARIZATION')
              WRITE(6,224)
  224         FORMAT(/,2X,'1',9X,'PERPENDICULAR')
              WRITE(6,225)
  225         FORMAT(2X,'2',9X,'PARALLEL'////)
              READ(5,*)CODE
C
              PRINT 90
   90         FORMAT(1X,'FREQ(MHZ)',12X,'GAMMA')
              PRINT 95
   95         FORMAT(17X,'MAG',4X,'PHASE'/)
C
C
C   IF-THEN IS FOR THE TWO DIFFERENT POLARIZATIONS
C
C
C
      IF(CODE.EQ.1)THEN
C
C
C   ******************************************
C   ******************************************
C
```

```
C        PERPENDICULAR  POLARIZATION
C
C  ***********************************************
C  ***********************************************
C
C
C
C
C
C
C  THIS IS WHERE THE REFLECTION COEFFICIENT FOR THE BULK LAYER
C     BACKED BY A METAL WALL IS DETERMINED.
C
C
            DO 40 I=1,NUMBR
         IIII=I
            XEND=0.0
            X=L
                E=CMPLX(Q(I,M),-Q(I,NN))
                PRO=2E6*PI*CSQRT(E-(SIN(A)**2))*Q(I,1)/3E8
                JPRO=CMPLX(-AIMAG(PRO),REAL(PRO))
C
C  THIS IS THE REFLECTION COEFFICIENT FOR THE BULK LAYER
C      BACKED BY A METAL PLATE
C
                FL=-CEXP(-2*JPRO*AD)
                Y(1)=REAL(FL)
                Y(2)=AIMAG(FL)
C
C   THIS IS THE TOLERANCE USED IN THE DIFFERENTIAL EQUATION SOLVER
C
                TOL=0.00001
C
C
C   THIS IS WHERE THE PROGRAM CALLS A SUBROUTINE TO SOLVE
C      THE RICCATI EQUATION FOR THE E-FIELD ORIENTED IN
C      THE PERPENDICULAR POLARIZATION.
C
C
                 CALL SOLVE(NEQ,FCN,X,XEND,TOL,Y)
C
C   THIS IS THE REFLECTION COEFFICIENT OF THE ARRAY OF CONES
C      OBTAINED FROM THE "SOLVE" ROUTINE
C
                G=CMPLX(Y(1),Y(2))
C
C   CALCULATE THE MAGNITUDE OF GAMMA
C
```

```
                MG=CABS(G)
C
C   CALCULATE THE PHASE OF GAMMA
C
                AG=ANGLE(G)
C
C   WRITE GAMMA VS FREQUENCY TO A DATA FILE
C
          WRITE(12,*)Q(I,1),MG
C
C   WRITE GAMMA TO THE SCREEN
C
                WRITE(6,100) Q(I,1),MG,AG
   100          FORMAT(1X,F7.2,5X,F8.5,1X,F8.5)

40          CONTINUE
C
C
        ELSE
C
C
C   *******************************************
C   *******************************************
C
C       PARALLEL   POLARIZATION
C
C   *******************************************
C   *******************************************
C
C
C
C
C
C   THIS IS WHERE THE REFLECTION COEFFICIENT FOR THE BULK LAYER
C       BACKED BY A METAL WALL IS DETERMINED.
C
C
                DO 49 I=1,NUMBR
         IIII=I
           XEND=0.0
             X=L
                E=CMPLX(Q(I,M),-Q(I,NN))
                PRO=2E6*PI*CSQRT(E-(SIN(A)**2))*Q(I,1)/3E8
                JPRO=CMPLX(-AIMAG(PRO),REAL(PRO))
C
C   THIS IS THE REFLECTION COEFFICIENT FOR THE BULK LAYER
C       BACKED BY A METAL PLATE
```

```
C
                FL=-CEXP(-2*JPRO*AD)
                Y(1)=REAL(FL)
                Y(2)=AIMAG(FL)
C
C   THIS IS THE TOLERANCE USED IN THE DIFFERENTIAL EQUATION SOLVER
C
                TOL=0.00001
C
C
C   THIS IS WHERE THE PROGRAM CALLS A SUBROUTINE TO SOLVE
C     THE RICCATI EQUATION FOR THE E-FIELD ORIENTED IN
C     THE PARALLEL POLARIZATION.
C
C
                CALL SOLVE(NEQ,FCN,X,XEND,TOL,Y)
C
C   THIS IS THE REFLECTION COEFFICIENT OF THE ARRAY OF CONES
C     OBTAINED FROM THE "SOLVE" ROUTINE
C
                G=CMPLX(Y(1),Y(2))
C
C   CALCULATE THE MAGNITUDE OF GAMMA
C
                MG=CABS(G)
C
C   CALCULATE THE PHASE OF GAMMA
C
                AG=ANGLE(G)
C
C   WRITE GAMMA VS FREQUENCY TO A DATA FILE
C
            WRITE(12,*) Q(I,1),MG
C
C   WRITE GAMMA TO THE SCREEN
C
                WRITE(6,109) Q(I,1),MG,AG
   109          FORMAT(1X,F7.2,5X,F8.5,1X,F8.5)

49          CONTINUE
C
C
         ENDIF
C
            WRITE(6,777)
   777      FORMAT(/,4X,'ENTER 1 TO CONTINUE')
            READ(5,*) TESTT
```

```
              WRITE(6,329)
329           FORMAT(/////////////////////////)
              PRINT*,'ENTER THE CODE THAT CORRESPONDS TO'
              PRINT*,'   THE DESIRED ACTION'
              WRITE(6,323)
323           FORMAT(//,1X,'CODE',6X,'ACTION')
              WRITE(6,324)
324           FORMAT(/,2X,'1',9X,'CHANGE MATERIAL PROPERTIES')
              WRITE(6,325)
325           FORMAT(2X,'2',9X,'CHANGE CONE DIMENSIONS')
              WRITE(6,326)
326           FORMAT(2X,'3',9X,'EXIT PROGRAM'////)
              READ(5,*)CORE
              WRITE(6,327)
327           FORMAT(/////////////////////////)
C
C
              REWIND(7)
C
C
              IF(CORE.EQ.1)GOTO 997
              IF(CORE.EQ.2)GOTO 998
C
C
              STOP
              END
C
C ********************************************
C ********************************************
C
C ********************************************
C
C    THIS IS THE SUBROUTINE THAT IS CALLED FROM THE
C    THE "SOLVE" ROUTINE WHICH CALCULATES THE VALUE
C    OF THE REFLECTION COEFFICIENT OF THE ARRAY OF
C    CONES FOR THE PARALLEL POLARIZATION.
C
C ********************************************
C
C
      SUBROUTINE FCNLL(N,X,Y,YPRIME)
        COMPLEX YY,JYY,KO,NZ,CCC,E
        COMPLEX EEFF,TOP,BOT,ET,EEFFR,ZC,EPRIME,RIGHT,ZPRIME
        COMPLEX UBOT,UEFF,UPRIME,ZPL,ZPR
        REAL Y(N),YPRIME(N),X,NZR,NZI,YR,YI,Q(50,3),L
        COMMON DE,L,A,Q,IIII,KO,CCC,YY,JYY,NZ,E
           I=IIII
```

```
          KO=2*4*ATAN(1.0)*Q(I,1)*1E6
C
C  THIS IS WHERE THE VALUE FOR THE EFFECTIVE MATERIAL
C    PROPERTIES ARE CALCULATED
C
          UBOT=1+((X/L)**2)*(E-1)
          UEFF=1.256637E-6*(1-(SIN(A)**2)/UBOT)
          TOP=2*(8.854E-12)*(E-1)
          BOT=8.854E-12*((1+(X/L)**2)+(1-(X/L)**2)*E)
          EEFF=8.854E-12*(1+((X/L)**2)*TOP/BOT)
C
C   THIS IS THE VALUE FOR BETA
C
          YY=KO*CSQRT(EEFF*UEFF)
          JYY=CMPLX(-AIMAG(YY),REAL(YY))
          YR=REAL(JYY)
          YI=AIMAG(JYY)
C
C   THIS IS THE VALUE FOR THE CHARACTERISTIC IMPEDANCE
C
          ZC=CSQRT(UEFF/EEFF)
          RIGHT=1+8.854E-12*((X/L)**2)*(E-1)/BOT
C   THIS IS THE VALUE OF THE DERIVATIVE OF THE EFFECTIVE EPSILON
C
          EPRIME=(4*((8.854E-12)**2)*(X/L)*(E-1)/(BOT*L))*RIGHT
C
C   THIS IS THE VALUE OF THE DERIVATIVE OF THE EFFECTIVE MU
C
          UPRIME=2.513274E-6*(SIN(A)**2)*(X/L)*(E-1)/(L*(UBOT**2))
          ZPL=UPRIME/(CSQRT(EEFF*UEFF))
          ZPR=CSQRT(UEFF)*EPRIME/((EEFF)**1.5)
C
C   THIS IS THE VALUE OF THE DERIVATIVE OF THE IMPEDANCE
C
          ZPRIME=(ZPL-ZPR)/2
          NZ=ZPRIME/(2*ZC)
          NZR=REAL(NZ)
          NZI=AIMAG(NZ)
          YPRIME(1)=2*(YR*Y(1)-YI*Y(2))+(NZR*(Y(1)**2)-NZR-
     *              NZR*(Y(2)**2)-2*NZI*Y(1)*Y(2))
          YPRIME(2)=2*(YR*Y(2)+YI*Y(1))+(2*Y(1)*Y(2)*NZR-NZI
     *              +NZI*(Y(1)**2)-NZI*(Y(2)**2))
       RETURN
       END
C
C *********************************************
C *********************************************
```

```
C
C ***************************************************
C
C     THIS IS THE SUBROUTINE THAT IS CALLED FROM THE
C     THE "SOLVE" ROUTINE WHICH CALCULATES THE VALUE
C     OF THE REFLECTION COEFFICIENT OF THE ARRAY OF
C     CONES FOR THE PERPENDICULAR POLARIZATION
C
C ***************************************************
C
C
      SUBROUTINE FCNRR(NEQ,X,Y,YPRIME)
        COMPLEX YY,JYY,KO,NZ,CCC,E
        COMPLEX EEFF,TOP,BOT,ET,EEFFR,ZC,EPRIME,RIGHT,ZPRIME
        REAL Y(NEQ),YPRIME(NEQ),X,NZR,NZI,YR,YI,Q(50,3),L
        COMMON DE,L,A,Q,IIII,KO,CCC,YY,JYY,NZ,E
          I=IIII
          KO=2*4*ATAN(1.0)*Q(I,1)/300
C
C  THIS IS WHERE THE VALUE FOR THE EFFECTIVE MATERIAL
C     PROPERTIES ARE CALCULATED
C
          TOP=2*(8.854E-12)*(E-1)
          BOT=8.854E-12*((1+(X/L)**2)+(1-(X/L)**2)*E)
          ET=8.854E-12*(1+((X/L)**2)*TOP/BOT)
          EEFF=ET-(SIN(A)**2)*8.854E-12
          EEFFR=EEFF/8.854E-12
C
C    THIS IS THE VALUE FOR BETA
C
          YY=KO*CSQRT(EEFFR)
          JYY=CMPLX(-AIMAG(YY),REAL(YY))
          YR=REAL(JYY)
          YI=AIMAG(JYY)
C
C    THIS IS THE VALUE FOR THE CHARACTERISTIC IMPEDANCE
C
          ZC=CSQRT(1.256637E-6/EEFF)
C
C    THIS IS VALUE OF THE DERIVATIVE OF THE EFFECTIVE EPSILON
C
          RIGHT=1+8.854E-12*((X/L)**2)*(E-1)/BOT
          EPRIME=(4*((8.854E-12)**2)*(X/L)*(E-1)/(BOT*L))*RIGHT
C
C    THIS IS VALUE OF THE DERIVATIVE OF THE IMPEDANCE
C
```

```
          ZPRIME=-560.4991E-6*EPRIME/(CSQRT(EEFF)**3)
          NZ=ZPRIME/(2*ZC)
          NZR=REAL(NZ)
          NZI=AIMAG(NZ)
          YPRIME(1)=2*(YR*Y(1)-YI*Y(2))+(NZR*(Y(1)**2)-NZR-
     *              NZR*(Y(2)**2)-2*NZI*Y(1)*Y(2))
          YPRIME(2)=2*(YR*Y(2)+YI*Y(1))+(2*Y(1)*Y(2)*NZR-NZI
     *              +NZI*(Y(1)**2)-NZI*(Y(2)**2))
      RETURN
      END
C
C *********************************************
C *********************************************
C
C *********************************************
C
C  THIS SUBROUTINE CALCULATES THE PHASE OF GAMMA
C
C *********************************************
C
C
      FUNCTION ANGLE(CC)
         COMPLEX CC
                IF(REAL(CC).NE.0) GO TO 2
                IF(AIMAG(CC).GT.0.) GO TO 1
         ANGLE=-2*ATAN(1.0)
            GO TO 3
    1    ANGLE=2*ATAN(1.0)
            GO TO 3
    2 AG=ATAN2(AIMAG(CC),REAL(CC))
         ANGLE=AG
            GO TO 3
    3 RETURN
      END
```

We claim:

1. A process for constructing a pyramidal cone absorbing structure of a type employed in an anechoic chamber comprising the steps of:

selecting a complex permittivity, at a selected plurality of frequencies, of a material comprising the pyramidal cone absorbing structure;

computing, for a predetermined parallel and perpendicular polarization of an incident electromagnetic wave, a solution of a first order differential Riccati equation that expresses a derivative of a reflection coefficient as a function of effective properties of the material comprising the pyramidal cone absorbing structure, to obtain the magnitude of the reflection coefficient at each of said plurality of frequencies; and constructing a pyramidal cone absorbing structure having a desired computed magnitude of the reflection coefficient and having a length (L) of a tapered section forming a portion of the pyramidal cone absorbing structure, a thickness (d) of a backing layer forming a portion of the pyramidal cone absorbing structure, and an angle theta at which the incident electromagnetic wave impinges upon the pyramidal cone absorbing structure.

2. A process for constructing a pyramidal cone absorbing structure of a type employed in an anechoic chamber comprising the steps of:

selecting a complex permittivity, at each one of a desired plurality of frequencies, of a material comprising the pyramidal cone absorbing structure;

selecting a length (L) of a tapered section forming a portion of the pyramidal cone absorbing structure, a thickness (d) of a backing layer forming a portion of the pyramidal cone absorbing structure, and an angle theta at which an incident electromagnet wave impinges upon the pyramidal cone absorbing structure;

computing, for a predetermined one of a parallel polarization and a perpendicular polarization of an incident electromagnetic wave, a solution of a first order differential Riccati equation that expresses a derivative of a reflection coefficient as a function of effective properties, including the complex permittivity, of the material comprising the pyramidal cone absorbing structure, to obtain the magnitude of the reflection coefficient at each of said plurality of frequencies;

repeating said computing step for increasing values of complex permittivity to obtain a minimum magnitude of the reflection coefficient; and constructing a pyramidal cone absorbing structure having said computed minimum magnitude of the reflection coefficient and having the selected length (L) of the tapered section forming a portion of the pyramidal cone absorbing structure and the selected thickness (d) of the backing layer forming a portion of the pyramidal cone absorbing structure.

3. A process for constructing a pyramidal cone absorbing structure of a type employed in an anechoic chamber comprising the steps of:

selecting a complex permittivity, at each one of a desired plurality of frequencies, of a material comprising the pyramidal cone absorbing structure;

selecting a length (L) of a tapered section forming a portion of the pyramidal cone absorbing structure, a thickness (d) of a backing layer forming a portion of the pyramidal cone absorbing structure, and an angle theta at which an incident electromagnet wave impinges upon the pyramidal cone absorbing structure;

computing, for a predetermined one of a parallel polarization and a perpendicular polarization of an incident electromagnetic wave, a solution of a first order differential Riccati equation that expresses a derivative of a reflection coefficient as a function of effective properties, including the complex permittivity, of the material comprising the pyramidal cone absorbing structure, to obtain the magnitude of the reflection coefficient at each of said plurality of frequencies;

repeating said computing step for varying values of L and d for which the sum of L and d remains constant to obtain a minimum magnitude of the reflection coefficient for a given value of complex permittivity; and constructing a cone absorbing structure having said minimum magnitude of the reflection coefficient and having an associated length (L) of a tapered section forming a portion of the pyramidal cone absorbing structure and an associated thickness (d) of a backing layer forming a portion of the pyramidal cone absorbing structure.

* * * * *